United States Patent
Garcia

(10) Patent No.: US 9,637,242 B2
(45) Date of Patent: *May 2, 2017

(54) TORQUE SPLIT GEARBOX FOR ROTARY WING AIRCRAFT

(71) Applicant: Sikorsky Aircraft Corporation, Stratford, CT (US)

(72) Inventor: Todd A. Garcia, Mansfield, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,187

(22) Filed: Jan. 29, 2016

(65) Prior Publication Data

US 2016/0152342 A1 Jun. 2, 2016

Related U.S. Application Data

(63) Continuation of application No. 14/017,674, filed on Sep. 4, 2013, now Pat. No. 9,278,760.

(51) Int. Cl.
| | |
|---|---|
| *B64D 35/06* | (2006.01) |
| *F16H 37/06* | (2006.01) |
| *B64C 27/12* | (2006.01) |
| *B64C 27/10* | (2006.01) |

(52) U.S. Cl.
CPC .............. *B64D 35/06* (2013.01); *B64C 27/10* (2013.01); *B64C 27/12* (2013.01); *F16H 37/065* (2013.01); *Y10T 74/19121* (2015.01)

(58) Field of Classification Search
CPC ......... B64C 27/08; B64C 27/10; B64C 27/12; B64C 27/14; B64D 35/04; B64D 35/06
See application file for complete search history.

(56) References Cited

U.S. PATENT DOCUMENTS

| | | | |
|---|---|---|---|
| 2,823,558 | A | 2/1958 | Semar et al. |
| 3,824,875 | A | 7/1974 | Willert et al. |
| 4,489,625 | A | 12/1984 | White |
| 4,682,510 | A | 7/1987 | De Bernardi |
| 5,113,713 | A | 5/1992 | Isabelle et al. |
| 5,802,918 | A | 9/1998 | Chen et al. |

(Continued)

FOREIGN PATENT DOCUMENTS

FR 2620106 A1 3/1989

OTHER PUBLICATIONS

PCT IPRP, issued on Mar. 17, 2016 in PCT/US14/053058.

(Continued)

*Primary Examiner* — Joseph W Sanderson
*Assistant Examiner* — Christopher Hutchens
(74) *Attorney, Agent, or Firm* — Cantor Colburn LLP

(57) ABSTRACT

A gearbox system for a dual coaxial counter rotating rotor assembly includes an input shaft to input a first torque into the gearbox system and a transfer shaft operably connected to the input shaft to transfer the first torque therethrough. Two gear sets are operably connected to the transfer shaft. Each gear set includes a first output gear to transfer a second torque acting in a first direction to a first rotor of a rotor assembly and a second output gear to transfer the second torque acting in a second direction opposite the first direction to a second rotor of the rotor assembly. The second torque transferred by each gear set of the two gear sets is substantially equal.

10 Claims, 5 Drawing Sheets

(56) References Cited

U.S. PATENT DOCUMENTS

| | | | |
|---|---|---|---|
| 5,813,292 | A | 9/1998 | Kish et al. |
| 6,467,726 | B1 * | 10/2002 | Hosoda ................... B64C 27/14 180/337 |
| 6,634,861 | B1 | 10/2003 | Altamura |
| 7,413,142 | B2 | 8/2008 | Gmirya |
| 7,918,146 | B2 | 4/2011 | Gmirya |
| 8,141,812 | B2 | 3/2012 | Stamps et al. |
| 8,397,603 | B2 | 3/2013 | Gmirya et al. |
| 2005/0011307 | A1 | 1/2005 | Gmirya |
| 2005/0132833 | A1 | 6/2005 | Gmirya et al. |
| 2007/0125907 | A1 | 6/2007 | Lappos et al. |
| 2009/0084891 | A1 | 4/2009 | Darrow et al. |
| 2011/0194935 | A1 | 8/2011 | Garcia et al. |
| 2012/0309583 | A1 | 12/2012 | Ai et al. |

OTHER PUBLICATIONS

ISR/WO, issued on Sep. 12, 2014 in PCT/US14/053058.
Final Office Action dated Jun. 30, 2015 in U.S. Appl. No. 14/017,674.
Non-Final Office Action dated Jan. 16, 2015 in U.S. Appl. No. 14/017,674.

* cited by examiner

US 9,637,242 B2

TORQUE SPLIT GEARBOX FOR ROTARY WING AIRCRAFT

CROSS-REFERENCE TO RELATED APPLICATION

This is a continuation application that claims the benefit of priority to U.S. patent application Ser. No. 14/017,674, which was filed on Sep. 4, 2013. The entire contents of U.S. patent application Ser. No. 14/017,674 are incorporated herein by reference.

BACKGROUND

The subject matter disclosed herein relates to the art of rotary wing aircraft and, more specifically, to gearbox systems for rotary wing aircraft.

A gearbox system of a rotary wing aircraft transfers power from an engine, or multiple engines, for example, a turbine engine, to the rotor system. A typical system directs power from the engine to a single rotor system including a plurality of rotor blades. Since rotational velocity of the rotor is typically lower than the rotational velocity of the engine, the gearbox is used to reduce the rotational velocity of the turbine engine. Torque is subsequently increased through a series of intermediate gear stages and shafts, with an output velocity provided to the rotor system.

In other rotary wing aircraft with more complex rotor systems, the complexity of the gearbox typically also increases. For example, some rotary wing aircraft, such as the X2® helicopter produced by Sikorsky Aircraft Corporation, have two coaxial counter rotating main rotor assemblies. As such, the gearbox must be configured to transfer engine power to both rotor assemblies at the required directions of rotation, requiring two large final reduction stages. Further in X2®-type aircraft, the gearbox is further utilized to transfer power to a propeller assembly, typically located at a tail of the aircraft, to provide additional forward thrust. Consequently, the typical gearbox for such an aircraft is large and heavy.

BRIEF DESCRIPTION

In one embodiment, a gearbox system is connectable to an exterior shaft which relays a first torque with respect to the gearbox. The gearbox system includes an input bevel shaft operably connectable to the exterior shaft to transfer the first torque therethrough and two gear sets operably connected to the input bevel shaft. Each gear set includes a first output pinion to transfer a second torque acting in a first direction to a first gear and a second output pinion to transfer the second torque acting in a second direction opposite the first direction to a second output pinion coaxial with the first output pinion. The second torque transferred by each gear set of the two gear sets is substantially equal.

In another embodiment, a drive system for a dual coaxial counter rotating assembly includes an engine outputting a first torque via an input shaft and a gearbox assembly to reduce the first torque to a second torque and transfer the second torque to the dual coaxial counter rotating assembly. The gearbox assembly includes an input bevel shaft operably connected to the input shaft to transfer the first torque therethrough and two gear sets operably connected to the input bevel shaft. Each gear set includes a first output pinion to transfer a second torque acting in a first direction to a first rotating element of the dual coaxial counter rotating assembly and a second output pinion to transfer the second torque acting in a second direction opposite the first direction to a second rotating element of the dual coaxial counter rotating assembly. The second torque transferred by each gear set of the two gear sets is substantially equal.

In yet another embodiment, a rotary wing aircraft includes an airframe and a rotor assembly. The rotor assembly includes a first rotor rotatable about a rotor axis in a first direction and a second rotor coaxial with the first rotor and rotatable about the rotor axis in a second direction opposite the first direction. A drive system includes an engine outputting a first torque and a gearbox assembly to reduce the first torque to a second torque and transfer the second torque to the rotor assembly. The gearbox assembly includes an input shaft to input the first torque into the gearbox assembly, an input bevel shaft operably connected to the input shaft to transfer the first torque therethrough and two gear sets operably connected to the transfer shaft. Each gear set includes a first output pinion to transfer a second torque acting in the first direction to the first rotor and a second output pinion to transfer the second torque acting in the second direction to the second rotor.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
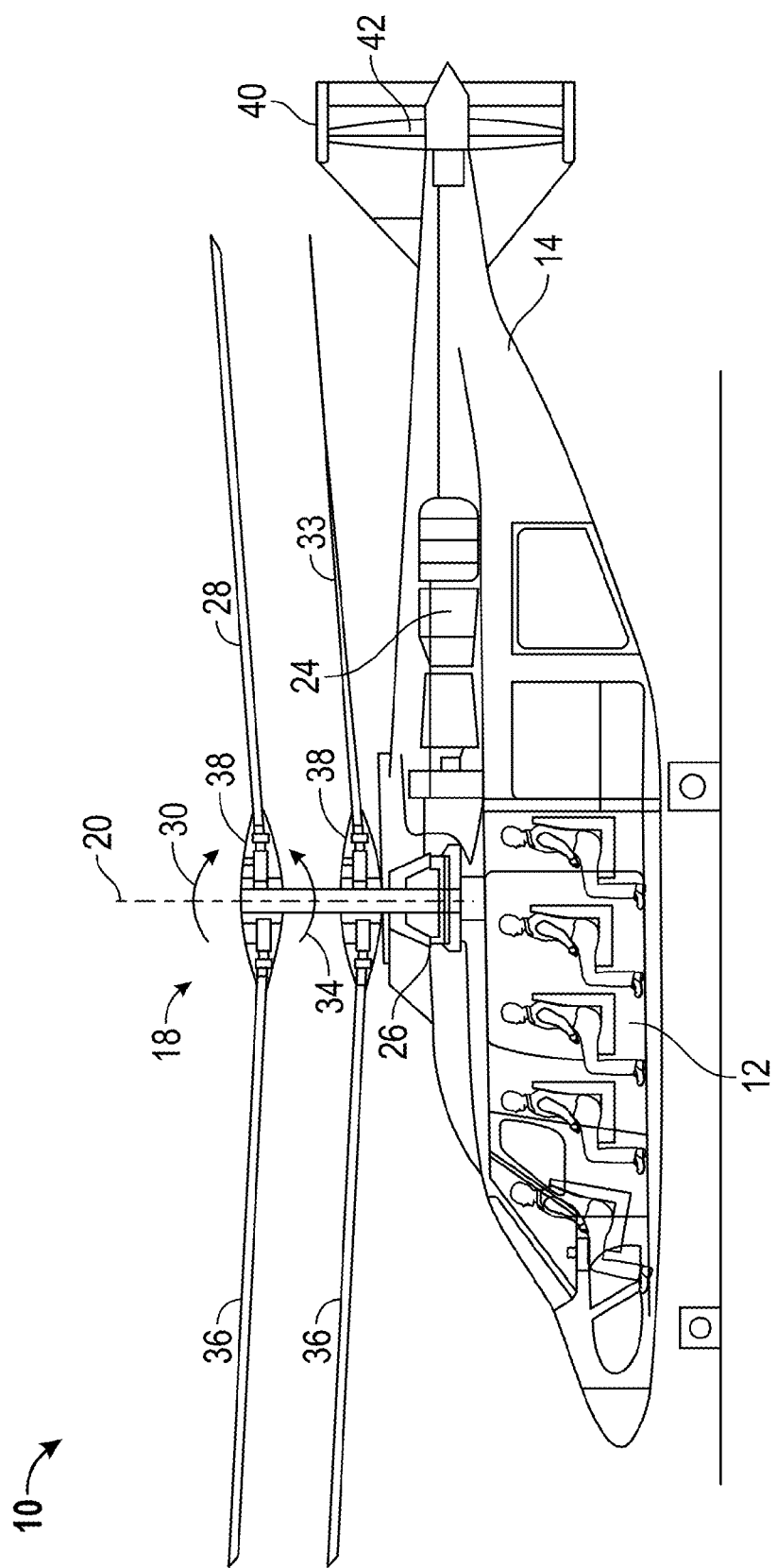
FIG. 1 is a schematic view of an embodiment of a rotary wing aircraft.

Shown in FIG. 1 is schematic view of an embodiment of a rotary wing aircraft, in this embodiment a helicopter 10. The helicopter 10 includes an airframe 12 with an extending tail 14. A dual, counter rotating coaxial main rotor assembly 18 is located at the airframe 12 and rotates about a main rotor axis 20. The main rotor assembly 18 is driven by a power source, for example, an engine 24 via a gearbox 26. The main rotor assembly 18 includes an upper rotor assembly 28 driven in a first direction 30 about the main rotor axis 20, and a lower rotor assembly 32 driven in a second direction 34 about the main rotor axis 20, opposite to the first direction 30. While, in FIG. 1, the first direction 30 is illustrated as counter-clockwise and the second direction 34 is illustrated as counter clockwise, it is to be appreciated that in some embodiments the directions of rotation of the upper rotor assembly 28 and lower rotor assembly 32 may be reversed. Each of the upper rotor assembly 28 and the lower rotor assembly 32 include a plurality of rotor blades 36 secured to a rotor hub 38. In some embodiments, the helicopter 10 further includes a translational thrust system 40 located at the extending tail 14 to provide translational thrust for the helicopter 10. The translational thrust system 40 includes a propeller rotor 42 connected to and driven by the engine 24 via the gearbox 26. While shown in the context of a pusher-prop configuration, it is understood that the propeller rotor 42 could also be more conventional puller prop or could be variably facing so as to provide torque in addition to or instead of translational thrust.

Figure 2:
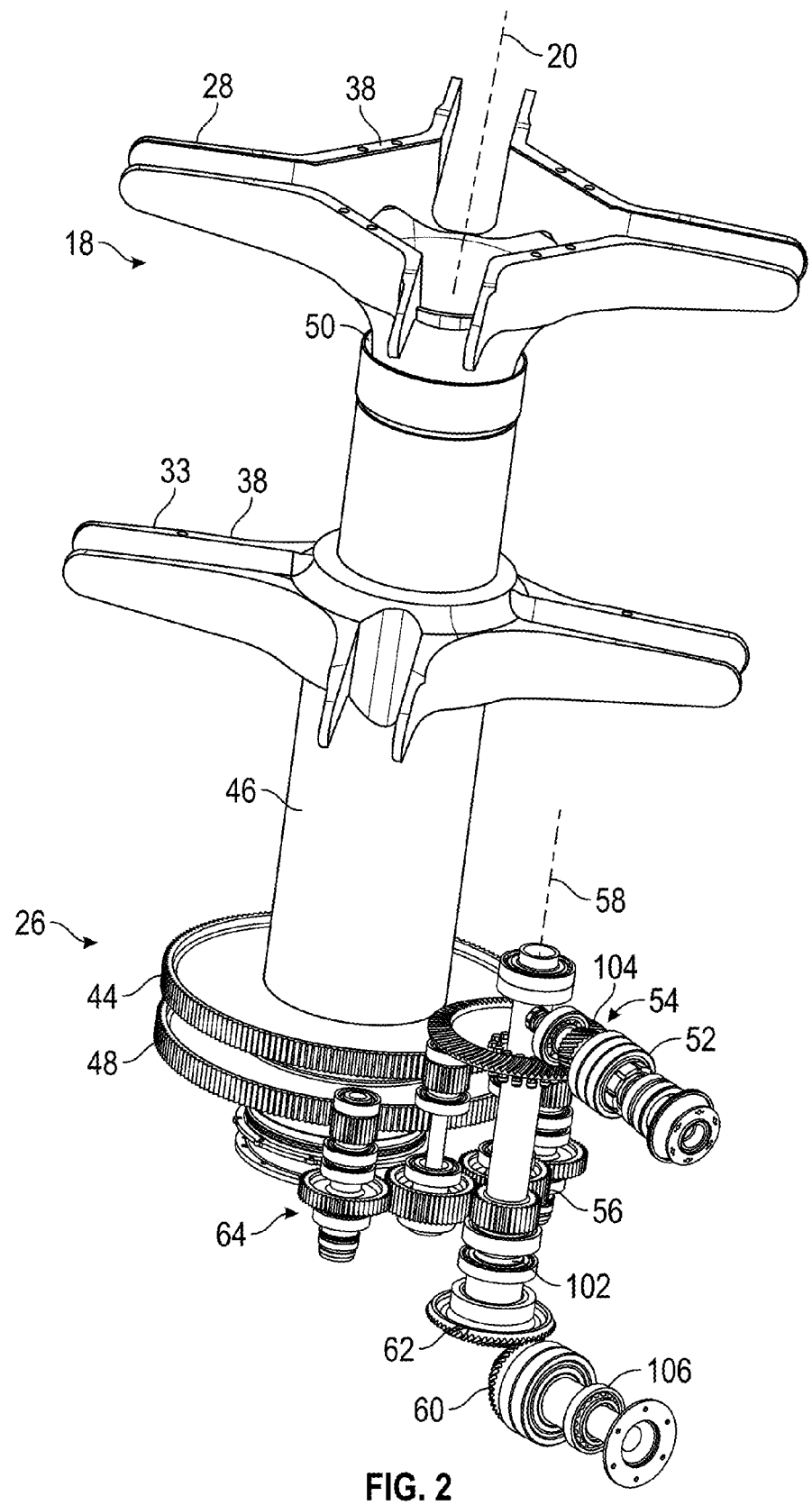
FIG. 2 is a perspective view of an embodiment of a main gearbox assembly for a rotary wing aircraft.

Shown in FIG. 2 is a perspective view of are embodiments of a main rotor assembly 18 and a gearbox 26. The gearbox 26 includes an upper bull gear 44 located at the main rotor axis 20 and connected to the lower rotor assembly 32 via a lower rotor shaft 46 extending along the main rotor axis 20. A lower bull gear 48 is located at the main rotor axis 20 and is connected to the upper rotor assembly 28 via an upper rotor shaft 50 extending along the main rotor axis 20, and through an interior of the lower rotor shaft 46. Torque and rotational speed are provided to the gearbox 26 via input shaft 52 that transmits the torque and rotational speed from the engine 24 to an input bevel gear 54 disposed at an input bevel shaft 56 of the gearbox 26 via an input bevel pinion 104. In some embodiments, the input bevel shaft 56 rotates about an input bevel shaft axis 58 parallel to the main rotor axis 20. The propeller rotor 42 is driven by a propeller output shaft 106 driven by a propeller output gear 62 disposed at a quill shaft 102, or an extension of input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. While shown with the propeller output shaft 106 driven by the propeller output gear 62, it is understood that such elements could be removed where the propeller rotor 42 is not used or is separately driven.

Figure 3:
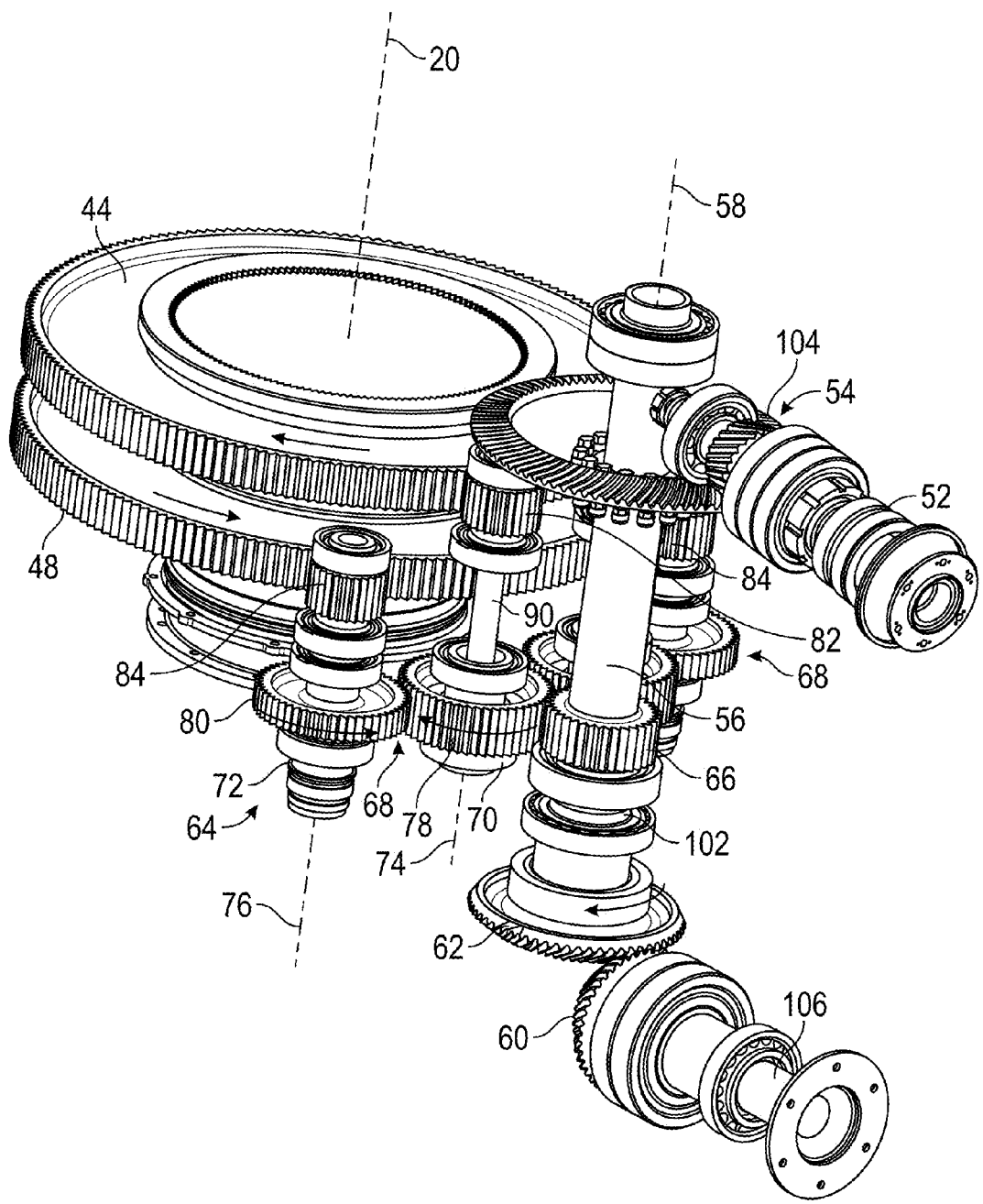
FIG. 3 is a perspective view of an embodiment of a gear train for a rotary wing aircraft.
Figure 4:
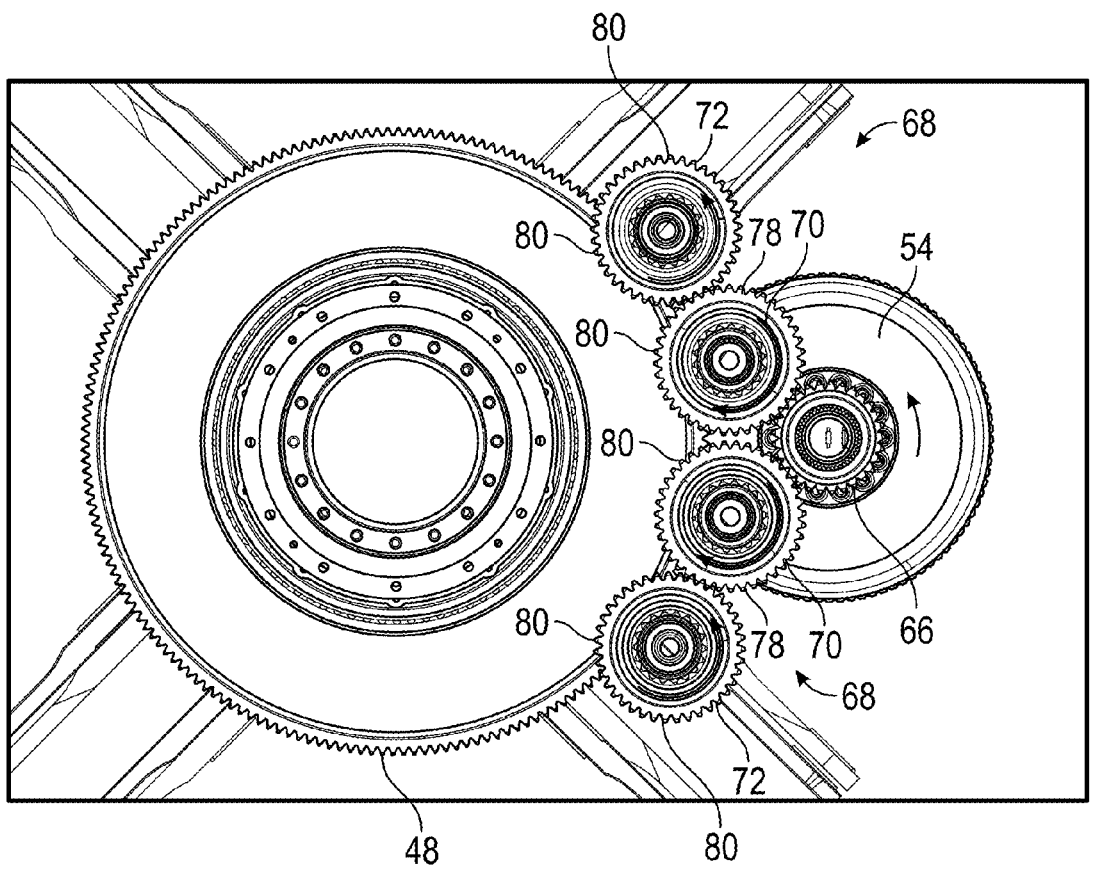
FIG. 4 is a plan view looking upward of an embodiment of a gear box assembly for a rotary wing aircraft.

Referring to FIGS. 3 and 4, the torque split gear reduction stage 64 will now be described in greater detail. A pinion, transfer gear 66 is located at the input bevel shaft 56 and is meshed with two intermediate gear sets 68 to split the torque of the input bevel shaft 56. Each intermediate gear set 68 is substantially the same, so the structure and operation of one gear set 68 will now be described with the understanding that the other gear set 68 is similarly constructed. The gear set 68 includes an inner shaft 70 and an outer shaft 72, with axes 74, 76 of the inner shaft 70 and outer shaft 72, respectively, each parallel to the input bevel shaft axis 58. While shown two intermediate gear sets 68, it is understood that other numbers of intermediate gear sets 68 could be used in other aspects such as where additional engines are used, and/or additional torque splitting is required, as compared to the shown embodiment.

Referring to FIG. 4, the inner shaft 70, located closest to transfer shaft 56, includes an inner spur idler 78, which is meshed with the transfer gear 66. Likewise, the outer shaft 72 includes an outer spur gear 80, which is meshed with the inner spur idler 78. In some embodiments, a gear ratio between the inner spur idler 78 and the outer spur gear 80 is 1:1, however it is understood that the gear ratio of the inner spur idler 78 and the outer spur gear 80 could be other than 1:1, such as where the bull gears 44, 48 are being driven at different rates or where additional gears (not shown), or ratios, are used which have a like effect to a 1:1 gear ratio.

As shown in FIG. 4, in this view looking upward, counterclockwise rotation of the input bevel gear 54 urges clockwise rotation of the inner shaft 70 and clockwise rotation of the outer shaft 72. Referring again to FIG. 3, torque is transmitted from the gear set 68 to the upper bull gear 44 via an upper output pinion 82 at the inner shaft 70, thus urging clockwise rotation of the upper bull gear 44 and the lower rotor assembly 32. A lower output pinion 84 at the outer shaft 72 transfers torque from the gear set 68 to the lower bull gear 48. While the gear sets 68 are described herein as having an inner spur idler 78 and an outer spur gear 80, it is to be appreciated that other embodiments may include one or more intermediate idlers (not shown) between the inner spur idler 78 and the outer spur gear 80 to achieve a desired gear reduction at the upper bull gear 44 and/or the lower bull gear 48. Further, while spur idlers and pinions are described and shown herein, it is to be appreciated that other configurations including helical mesh or any other parallel axis gear mesh may be utilized. Lastly, while described in terms of clockwise and counterclockwise rotations, it is understood that the specific rotational direction is not restricted so long as the opposite direction rotations occur for the shafts 56, 70, and 72.

Figure 5:
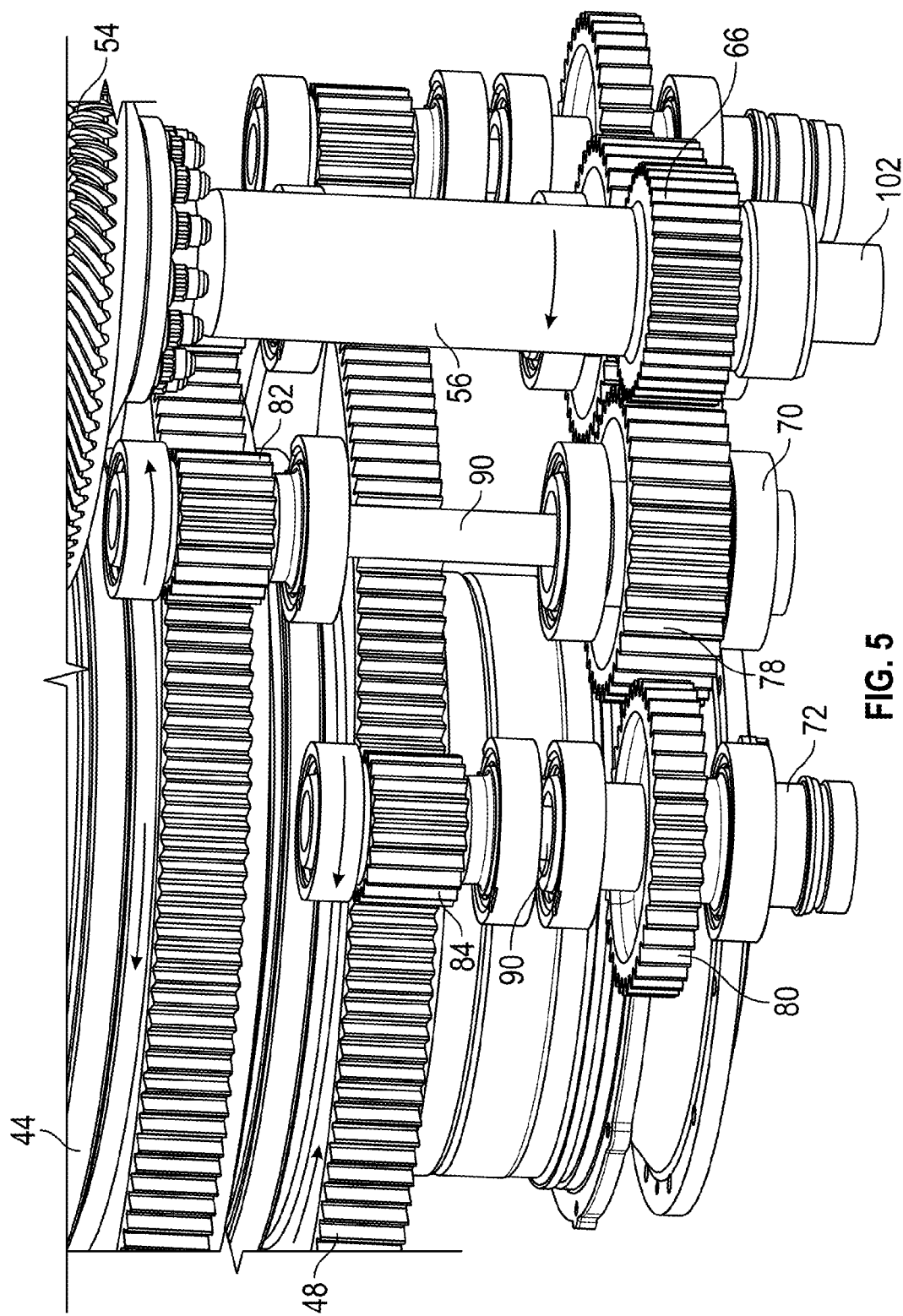
FIG. 5 is another plan view of an embodiment of a gear box assembly for a rotary wing aircraft.

Referring to FIG. 5, in some embodiments, the inner shaft 70 and outer shaft 72 at least partially comprise a compliant shaft member 90. The complaint shaft member 90 acts like a torsional spring, and ensures that the torque split between the respective upper output pinions 82 remains a 50-50 split, and the torque split between the respective lower output gears 84 also remains a 50-50 split. Utilizing two gear sets 68 to split the torque supplied by the transfer shaft 56 allows the upper output pinion 82 and lower output pinion 84 to be smaller thus allowing for a greater reduction at the upper bull gear 44 and the lower bull gear 48. In some embodiments, upper output pinion 82 and lower output pinion 84 are identical. Further, because the torque is split between the two gear sets 68, the face width, or thickness of each output pinion 82, 84 can be reduced, thus reducing weight and envelope required to house the gear sets 68. While described as transferring torque from the transfer shaft 56 to the two gear sets 68, it is understood that, in other aspects, the input bevel shaft 56 could receive transferred torque from the two gear sets 68 such as might occur when the rotor assemblies 28, 32 provide the input torque as in the case of a wind or water turbine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies, turbines, and/or fans where blade pitch control and compactness of design may be useful. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft, comprising:
   an airframe;
   a rotor assembly including a first rotor rotatable about a rotor axis in a first direction and a second rotor coaxial with the first rotor and rotatable about the rotor axis in a second direction opposite the first direction; and
   a drive system including plural engines outputting torque and a gearbox assembly to reduce torque produced from one or more of the engines to a reduced torque and to transfer the reduced torque to the rotor assembly, the gearbox assembly comprising:

an input shaft to input the torque into the gearbox assembly;

an input bevel shaft operably connected to the input shaft to transfer the torque therethrough; and two gear sets operably connected to the input bevel shaft, each gear set including first and second intermediate shafts, the first intermediate shaft having a first intermediate idler meshed with a transfer gear of the input bevel shaft and a first output pinion to transfer the reduced torque to the first rotor, and the second intermediate shaft having a first intermediate gear meshed with the first intermediate idler and a second output pinion to transfer the reduced torque to the second rotor.

2. The rotary wing aircraft according to claim 1, wherein the first output pinion and the second output pinion have axes of revolution parallel to an input bevel shaft axis.

3. The rotary wing aircraft according to claim 1, wherein the rotor assembly further comprises:

a first bull gear operably connected to the first rotor via a first rotor shaft; and a second bull gear operably connected to the second rotor via a second rotor shaft coaxial with the first rotor shaft.

4. The rotary wing aircraft according to claim 3, wherein the first output pinion is meshed with the first bull gear and the second output pinion is meshed with the second bull gear.

5. The rotary wing aircraft according to claim 3, wherein the second rotor shaft is located inside of the first rotor shaft.

6. The rotary wing aircraft according to claim 1, further comprising a propeller assembly including:

a propeller output gear operably connected to the input bevel shaft to drive a propeller output shaft; and a propeller operably connected to the propeller output shaft to provide translational thrust for the aircraft.

7. A rotary wing aircraft, comprising:

first and second coaxial, counter-rotating rotors;

one or more engines disposed to produce torque to drive respective rotations of the first and second coaxial, counter-rotating rotors; and a gearbox assembly configured to reduce the torque produced by the one or more engines and to transfer the reduced torque to the first and second coaxial, counter-rotating rotors, the gearbox assembly comprising:

an input shaft;

an input bevel shaft operably connected to the input shaft to transfer torque input by the input shaft therethrough; and two gear sets operably connected to the input bevel shaft, each gear set including first and second intermediate shafts, the first intermediate shaft having a first intermediate idler meshed with a transfer gear of the input bevel shaft and a first output pinion to transfer the reduced torque, which is reduced from the torque input by the input shaft, to the first rotor, and the second intermediate shaft having a first intermediate gear meshed with the first intermediate idler and a second output pinion to transfer the reduced torque to the second rotor.

8. The rotary wing aircraft according to claim 7, wherein the first output pinion and the second output pinion have axes of revolution parallel to an input bevel shaft axis.

9. The rotary wing aircraft according to claim 7, further comprising a propeller assembly including:

a propeller output gear operably connected to the input bevel shaft to drive a propeller output shaft; and a propeller operably connected to the propeller output shaft to generate translational thrust.

10. The rotary wing aircraft according to claim 7, further comprising an intermediate gear set for association with at least one of the one or more engines, the intermediate gear set being configured for additional torque splitting.

* * * * *